(12) United States Patent
Andersson

(10) Patent No.: US 11,684,812 B2
(45) Date of Patent: Jun. 27, 2023

(54) FIREFIGHTING FOAM-MIXING SYSTEM

(71) Applicants: INCENDIUM AB, Kungälv (SE); RÄDDNINGSTJÄNSTUTRUSTNING I GÖTEBORG AB, Gothenburg (SE)

(72) Inventor: Ulf Andersson, Gothenburg (SE)

(73) Assignees: INCENDIUM AB, Kungälv (SE); RÄDDNINGSTJÄNSTUTRUSTNING I GÖTEBORG AB, Gothenburg (SE)

( * ) Notice: Subject to any disclaimer, the term of this patent is extended or adjusted under 35 U.S.C. 154(b) by 64 days.

(21) Appl. No.: 17/052,263

(22) PCT Filed: Apr. 9, 2019

(86) PCT No.: PCT/SE2019/050331
§ 371 (c)(1),
(2) Date: Nov. 2, 2020

(87) PCT Pub. No.: WO2019/212398
PCT Pub. Date: Nov. 7, 2019

(65) Prior Publication Data
US 2021/0052927 A1 Feb. 25, 2021

(30) Foreign Application Priority Data
May 3, 2018 (SE) .................... 1850523-0

(51) Int. Cl.
*A62C 5/02* (2006.01)
(52) U.S. Cl.
CPC .................... *A62C 5/02* (2013.01)

(58) Field of Classification Search
CPC .......... A62C 35/02; A62C 5/02; A62C 5/024; B65D 83/0061
See application file for complete search history.

(56) References Cited

U.S. PATENT DOCUMENTS

| 3,720,230 | A | * | 3/1973 | Stockstill | ............... E03C 1/046 137/564.5 |
| 5,009,244 | A | * | 4/1991 | Grindley | .................. A62C 5/02 137/512.2 |
| 5,823,219 | A | * | 10/1998 | Purvis | .................. G05D 11/139 137/5 |
| 5,996,700 | A | * | 12/1999 | Sulmone | .................. A62C 5/02 169/15 |
| 7,093,606 | B2 | * | 8/2006 | Roberts | ................ A01C 23/042 222/386.5 |
| 7,469,661 | B2 | * | 12/2008 | Kunstmann | ............ F02M 25/14 123/198 A |

(Continued)

FOREIGN PATENT DOCUMENTS

| EP | 2468391 A1 | 6/2012 |
| WO | 2016048136 A1 | 3/2016 |

OTHER PUBLICATIONS

PCT International Search Report and Written Opinion dated May 20, 2019 for International Application No. PCT/SE2019/050331, 8 pages.

(Continued)

*Primary Examiner* — Joseph A Greenlund
(74) *Attorney, Agent, or Firm* — RMCK Law Group, PLC

(57) ABSTRACT

The present disclosure generally relates to a firefighting foam-mixing system and to a water diverter arrangement for use in a firefighting foam-mixing system.

9 Claims, 4 Drawing Sheets

(56) References Cited

U.S. PATENT DOCUMENTS

| | | | | |
|---|---|---|---|---|
| 8,814,005 B2* | 8/2014 | Banks | ............... | B01F 23/235 |
| | | | | 222/145.5 |
| 10,786,795 B2* | 9/2020 | Boticki | ............. | B01F 35/71805 |
| 11,027,158 B1* | 6/2021 | Black | ................... | A62C 35/68 |
| 11,028,727 B2* | 6/2021 | Kulkarni | ................ | B29C 64/10 |
| 2005/0263297 A1* | 12/2005 | Dimarzo | ................ | A62C 5/02 |
| | | | | 169/44 |
| 2006/0151184 A1* | 7/2006 | Boyle | .................... | A62C 5/02 |
| | | | | 169/5 |
| 2007/0114046 A1* | 5/2007 | Munroe | ................ | A62C 5/02 |
| | | | | 169/56 |
| 2010/0314137 A1* | 12/2010 | Jackson | ................ | A62C 5/02 |
| | | | | 137/100 |
| 2014/0238703 A1* | 8/2014 | Stephens | ............... | A62C 27/00 |
| | | | | 73/861.08 |
| 2021/0052927 A1* | 2/2021 | Andersson | ........... | G05D 11/006 |
| 2022/0123383 A1* | 4/2022 | Lee | ................ | H01M 10/6568 |

OTHER PUBLICATIONS

Swedish Search Report dated Dec. 6, 2018 for Swedish Application No. 1850523-0, 3 pages.

* cited by examiner

FIREFIGHTING FOAM-MIXING SYSTEM

CROSS-REFERENCE TO RELATED APPLICATIONS

This application is a 371 U.S. National Stage of International Application No. PCT/SE2019/050331, filed Apr. 9, 2019, which claims priority to Swedish Patent Application No. 1850523-0, filed May 3, 2018. The disclosures of each of the above applications are incorporated herein by reference in their entirety.

TECHNICAL FIELD

The present disclosure generally relates to a firefighting foam-mixing system and to a water diverter arrangement for use in a firefighting foam-mixing system.

BACKGROUND OF THE PRESENT DISCLOSURE

Various types of devices and systems have been proposed for use in injecting foaming agents into e.g. a water stream for generating foam to be used in extinguishing a fire. Such devices/systems include, for example, metering pumps, water powered pumps, direct injection systems, etc. The goal is to achieve "balanced pressure" between the fluid line (typically a water line) and a line for providing the foaming agents. At balanced pressure, the system responds to high fluid pressure with a correlatively high pressure as to the foaming agents, and corresponds to low fluid pressure with a relatively low pressure as to the foaming agents. Thus, at high water pressure and flows, the foaming agents are added at an equal pressure and at a flow calculated to maintain a pre-determined ratio of water to foam. The same is true for low pressure and flow.

In the firefighting field, it is highly critical to optimize the balance between water and the foaming agents to achieving a high firefighting efficiency. The foaming agents are typically added in ranges between 0.2%-6%, depending on the type of foaming agents and fuel of the target fire. Further complicating the task of balancing pressure is the extremely variable water flows and pressures that may be present at the site of the fire. Thus, the amount and pressure of the foaming agents must meet the varying pressure and volume of water being used.

An exemplary implementation for trying to overcome this problem is disclosed in WO2016048136, specifically applying an electrically controlled approach for disposing a desirable quantity of the foaming agents with the water stream. Specifically, in WO2016048136 a control unit is arranged to control a control valve, which is adapted to reduce the flow through a firefighting foam supply line, based on an intermediate amount of water and foaming agent running through a water line and the firefighting foam supply line, respectively. The amount of water running through the respective lines is measures using flow meters.

Even though WO2016048136 introduces an interesting approach to solving the above-mentioned problems with limited addition of foaming agents to a water stream and varying water pressures, the introduction of electrically controlled equipment may be problematic in some situations, for example where the firefighting foam-mixing system is possibly positioned remotely from general electrical installations. The supply of electrical power may also be interrupted in case of a fire. Additionally, an electrically controlled valve is furthermore prone to possible malfunction (as compared to its mechanical counterpart), thereby increasing the risk with malfunction of the total firefighting foam-mixing system.

Furthermore, a conventional flow meter makes use of a paddlewheel for measuring said intermediate flow, where such a paddlewheel flow meter is affected by the viscosity of the liquid being measured, thus making it necessary to recalibrate them for foaming agents of differing viscosities, and making them impossible to use with foaming agents having non-Newtonian properties.

Based on the above, there appears to be room for further improvement regarding firefighting foam-mixing system, specifically adapted to handle foaming agents having non-Newtonian properties to be mixed with a water stream for generating foam to be used in extinguishing a fire.

SUMMARY OF THE PRESENT DISCLOSURE

In view of above-mentioned and other drawbacks of the prior art, it is an object of the present disclosure to provide an improved firefighting foam-mixing system, for example implemented using a novel type of water diverter arrangement.

According to an aspect of the present disclosure, it is therefore provided a firefighting foam-mixing system, comprising a water line for providing a water flow, a storage tank having an inlet and an outlet, the storage tank comprising an internally arranged membrane adapted for holding a foaming agent and connected to the outlet, a first conduit having a first end connected to the inlet of the storage tank, and a second conduit having a first end connected to the outlet of the storage tank and a second end connected to the water line at a first position, wherein the firefighting foam-mixing system further comprises a water diverter arrangement connected to the water line at a second position and to a second end of the first conduit, the second position being upstream of the first position in relation to the water flow through the water line, the water diverter arrangement is configured to, independent of a current flow of water at the second position, divert a predetermined proportion of the water flowing through the water line at the second position, to the first conduit for pressurizing an outside surface of the membrane.

The present disclosure is based upon the understanding that it would be desirable to handle the introduction of a desired amount of the foaming agent to the water flow, without having to resort to electrical measurements and control, as is suggested according to prior art. To achieve such a solution, the present disclosure introduces a specifically adapted water diverter arrangement, where the water diverter arrangement is configured to divert, independent of a current flow of water, a predetermined proportion of the water flowing through the water line.

That is, independently on how much water that is at a given time flowing through water line where the water diverter arrangement is arranged, the water diverter arrangement will allow a certain amount of water to enter into the storage tank on an outside of the internally arranged membrane (also defined as a "bladder") and pressurize the membrane (bladder). Accordingly, a corresponding amount of foaming agent arranged on "the other side" of the membrane (e.g. inside of the bladder) will be "pushed out" from the storage tank and into the water line (i.e. where the second conduit is connected to the water line) where the foaming agent is mixed with the water flowing in the water line for allowing the formation of a firefighting foam to be used in e.g. fighting an ongoing fire. Thus, the amount of foaming agent that is introduced to the water line will be proportionally the same independent on the current water flow through the water line (at the location where the water diverter arrangement is positioned).

An obvious advantage with the present disclosure as compared to prior art is that it will be possible to operate the firefighting foam-mixing system even in situations where there is e.g. a power outage or failure, since the disclosed solution will function without any use of electrical powering. In addition, the present disclosure effectively handle situations also where the foaming agent may have non-Newtonian properties, since the pressure provided at the surface of the membrane may be held to be directly dependent on the current water flow and since there is no need for e.g. an electrically controlled paddle wheel based flow meter for measuring the amount of foaming agent flowing towards the water line. Thus, the present disclosure may be used both in regards and independent of if the foaming agent has Newtonian or non-Newtonian properties.

In a preferred embodiment of the present disclosure the water diverter arrangement is configured to operate within a predetermined water flow range. That is, it may be desirable to allow some portions of the water diverter arrangement to be configured dependent on the expected water flow range. As such, it may be provided for further improvements in allowing the diverted proportion of water to be held essentially constant, at least within the predetermined water flow range.

Advantageously, the foaming agent is preferably introduced to the water line at the first position. In some embodiments, it may be desirable to provide means for improving the mixing of the foaming agent and the water at the first position, but this is optionally in relation to the general concept of the present disclosure.

The water diverter arrangement may in some embodiment allow for an adaptation of the predetermined proportion of water to be diverted, such as adjustable between 0.1%-6%. However, in a preferred embodiment of the present disclosure the predetermined proportion is fixed, for example in one embodiment in the vicinity of 3%, thereby allowing for the introduction of 3% of the foaming agent with the water flow.

In a preferred embodiment of the present disclosure the firefighting foam-mixing system further comprises a three-way valve arranged at the second conduit between the outlet of the storage tank and the first position. The three-way valve may typically be controlled to a first and to a second state. In the first state first state the foaming agent is introduced to the water line at the first position, i.e. essentially as discussed above.

However, in the second state it may be possible to instead allow the foaming agent to be introduced into a foam test line, in turn possibly connected to e.g. a test tank. Accordingly, by means of such an implementation it may be possible to perform tests of the firefighting foam-mixing system, without having to handle (destruct) the mixed water and foaming agent. Rather, the proportional amount of foaming agent forced out from within the storage tank may be handled separately, i.e. at the foam test line. The purpose of this testing is the possibility of checking if a desired composition of the firefighting foam (i.e. the concentration of the foaming agent in the flowing water). By not adding the foaming agent to the water, but allowing it to instead be provided to e.g. the test tank, a test may be performed without creating the firefighting foam.

In an optional embodiment of the present disclosure, the firefighting foam-mixing system may further comprise a balancing valve, the balancing valve having a first end connected to the first position of the water line and a second end connected to the second end of the second conduit.

According to another aspect of the present disclosure, there is provided a water diverter arrangement for a firefighting foam-mixing system, wherein the water diverter arrangement is configured to be connected to a water line comprised with the firefighting foam-mixing system, and divert a predetermined proportion of the water from the water line independent of a current flow of water at a position where the water diverter arrangement is connected to the water line. This aspect of the present disclosure provides similar advantages as discussed above in relation to the previous aspect of the present disclosure.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
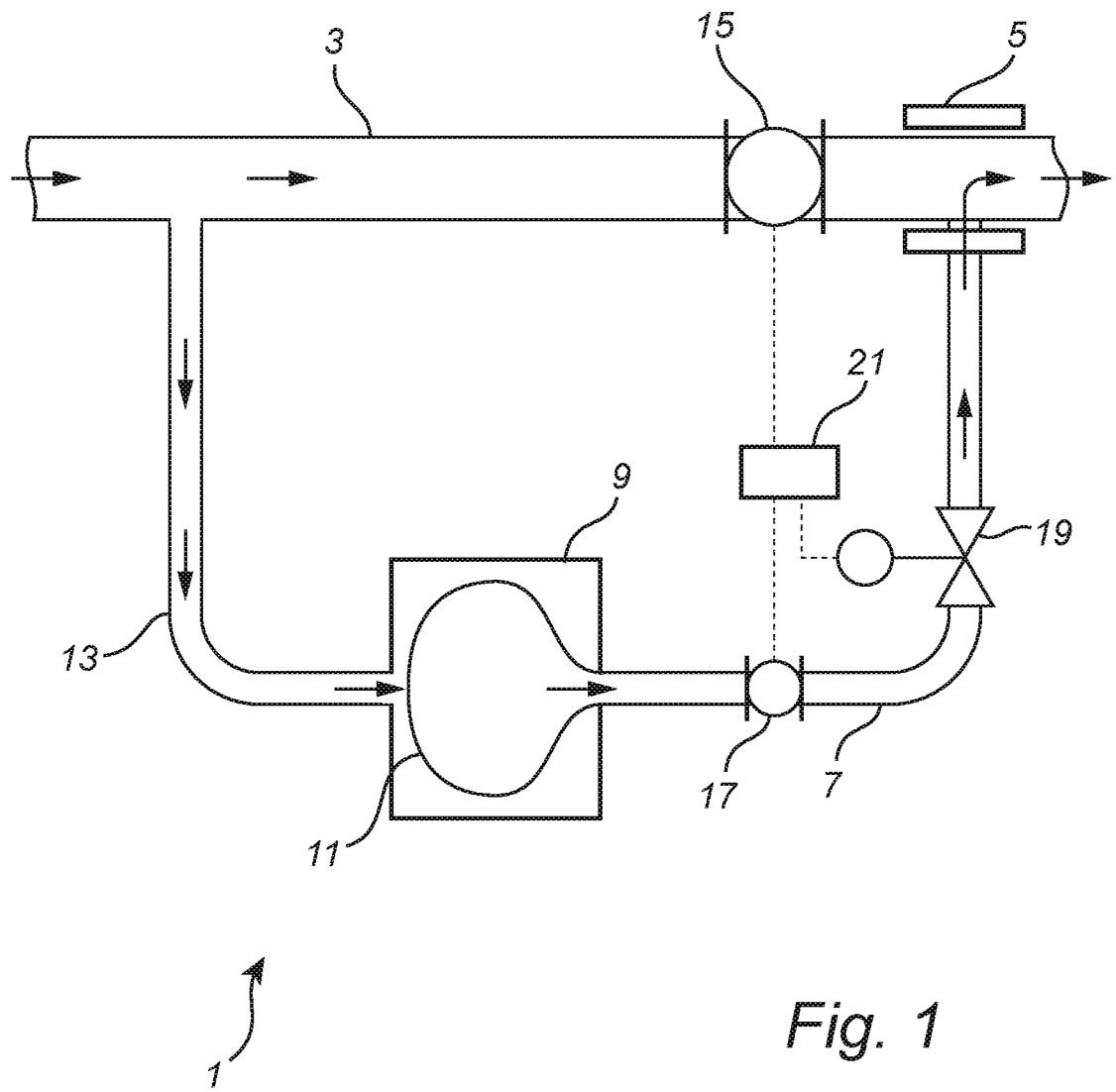
FIG. 1 exemplifies a prior-art firefighting foam-mixing system.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Turning now to the drawings and to FIG. 1 in particular, there is schematically illustrated a prior art firefighting foam system according to a prior-art implementation. The prior art firefighting foam system 1 comprises a water line 3 in which mixing means 5 are located which are formed by a restriction with a firefighting foam supply line 7 connected thereto which is connected to a firefighting foam storage tank 9. This firefighting foam storage tank is formed by a bladder tank in which a bladder 11 (e.g. a balloon) is located and which contains the foaming agent. The space in the bladder tank between the bladder and the tank wall is connected via a branch line 13 to the firefighting water line 3 upstream of the mixing means 5. The branch line 13 forms pressure means for pressurizing the foaming agent present in the firefighting foam storage tank 9.

The prior art firefighting foam system 1 further includes a first electromagnetic flow meter 15 which is located in the firefighting water line 3 upstream of the mixing means 5, for measuring the quantity of firefighting water running through the firefighting water line per unit of time. Furthermore, the firefighting foam system includes a second electromagnetic flow meter 17, typically being paddle wheel based, which is located in the firefighting foam supply line 7, for measuring the quantity of foaming agent running through the firefighting foam supply line per unit of time. As indicated above, such a paddle wheel based electromagnetic flow meter is not usable in relation to foaming agents having non-Newtonian properties.

The firefighting foam supply line 7 further accommodates an electrically controllable control valve 19 which can reduce the flow through the firefighting foam supply line. The prior art firefighting foam system 1 further includes an electronic control unit 21 which is connected to the two flow meters 15 and 17 and drives the control valve 19 in the case of an exceeding/falling short of a preset limit value for the proportion of the values measured by the two flow meters.

Thus, during operation of the prior art firefighting foam system 1, the control unit 21 will operate the control valve 19 such that a predefined proportion of the foaming agent is allowed to enter into the firefighting water running through the firefighting water line. The control unit 21 may as such be seen as an implementing a computer based control method for ensuring that the mixture between water and the foaming agent for forming the firefighting foam is within the desired range, such as a mixture of 3% foaming agent with water.

Figure 2:
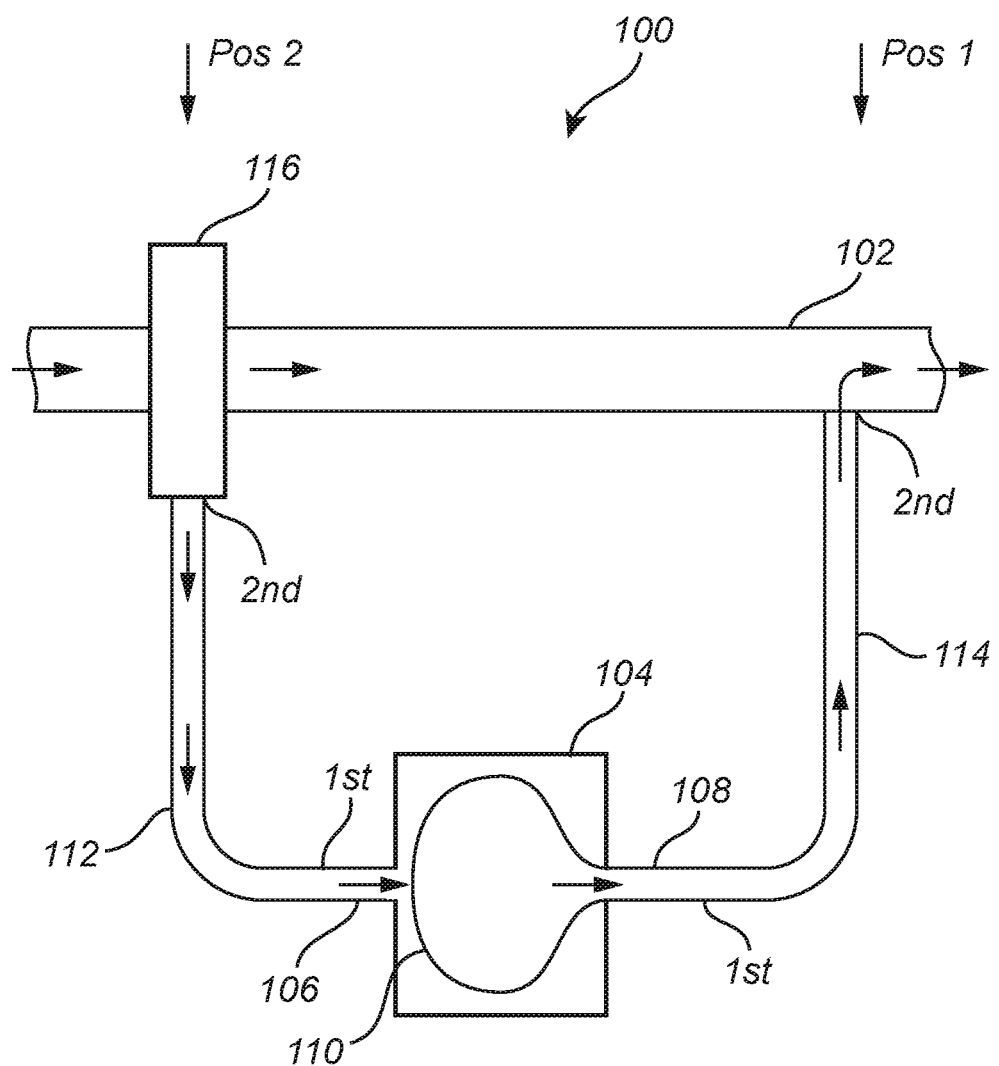
FIG. 2 schematically shows a firefighting foam-mixing system according to the present disclosure, FIGS. 3a and 3b exemplifies a currently preferred implementation of the firefighting foam-mixing system as shown in FIG. 2.

With reference now to FIG. 2, there is schematically illustrated an embodiment of the firefighting foam-mixing system 100 according to the present disclosure, implementing a completely mechanical solution without any need for any electrical connections or other electrical powering, thus making it highly useful in cases where electrical power cannot be provided or is otherwise hard to provide.

The firefighting foam-mixing system 100 according to the present disclosure comprises, similarly to the prior-art solution shown in FIG. 1, a water line 102 for providing a water flow, a storage tank 104 having an inlet 106 and an outlet 108, the storage tank 104 comprising an internally arranged membrane 110 (possibly implemented in a similar manner as the bladder/balloon as shown in FIG. 1) adapted for holding a foaming agent and being connected to the outlet 108. A first conduit 112 is provided and adapted to have a first end connected to the inlet 106 of the storage tank 104, as well as a second conduit 114 having a first end connected to the outlet 108 of the storage tank 104 and a second end connected to the water line 102 at a first position, defined as Pos1 in FIG. 2.

Contrary to the prior art solution of FIG. 1, the firefighting foam-mixing system 100 further comprises a water diverter arrangement 116 connected to the water line 102 at a second position, in FIG. 2 defined as Pos2, and to a second end of the first conduit 112, the second position Pos2 being upstream of the first position Pos1 in relation to the water flow through the water line 102. In accordance to the present disclosure and as discussed above, the water diverter arrangement 116 is configured to, independent of a current flow of water at the second position Pos2, divert a predetermined proportion of the water flowing through the water line 1002 at the second position Pos2, to the first conduit 112 for pressurizing an outside surface of the membrane 110. A further discussion and elaboration in relation to the water diversion arrangement will be provided in relation to FIGS. 4a and 4b below.

Accordingly, during operation of the firefighting foam-mixing system 100 according to the present disclosure, a predetermined amount of water, such as in a non-limiting example of 3%, will be diverted from the water line 102 by means of the water diverter arrangement 116 and passed through the first conduit 112 and into the storage tank 104 at the inlet 106. The water will then put a pressure to the balloon/bladder/membrane 110, such as a corresponding amount of foaming agent will be pushed out of the storage tank 104 at the outlet 108, pass through the second conduit 114 and then into the water line 102 where the foaming agent will mix with the water flowing through the water line 102.

The water line 102 is then typically connected (not explicitly shown) to e.g. firefighting foam distribution means, such as e.g. a sprinkler system or similar means for distributing the firefighting foam at e.g. an ongoing fire.

Figure 3A:
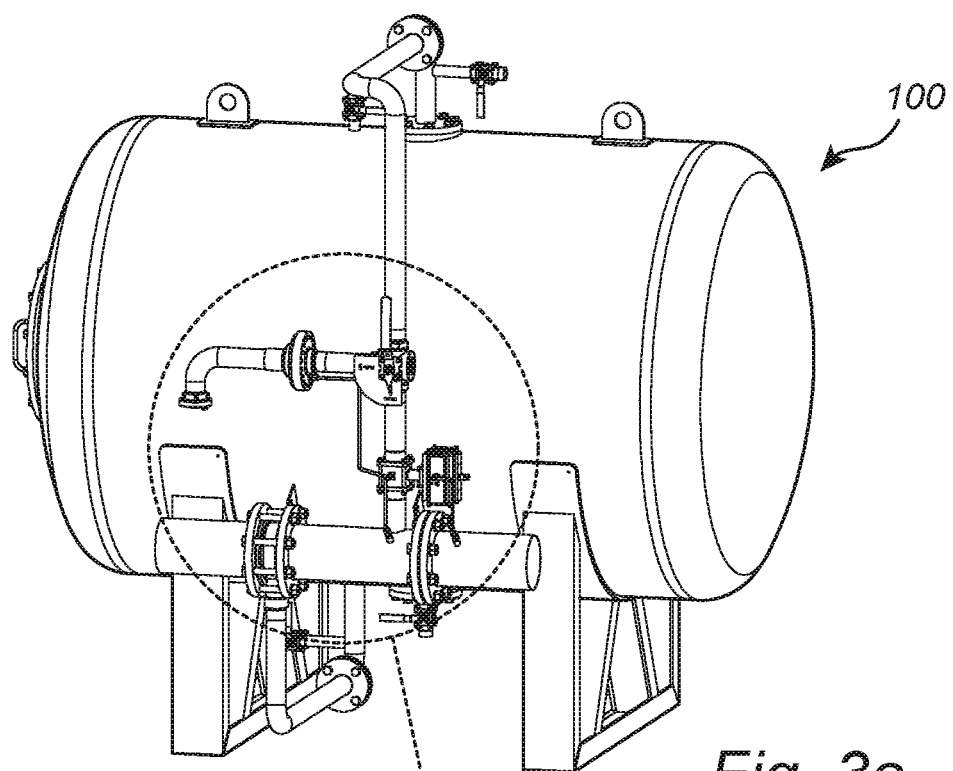
Figure 3B:
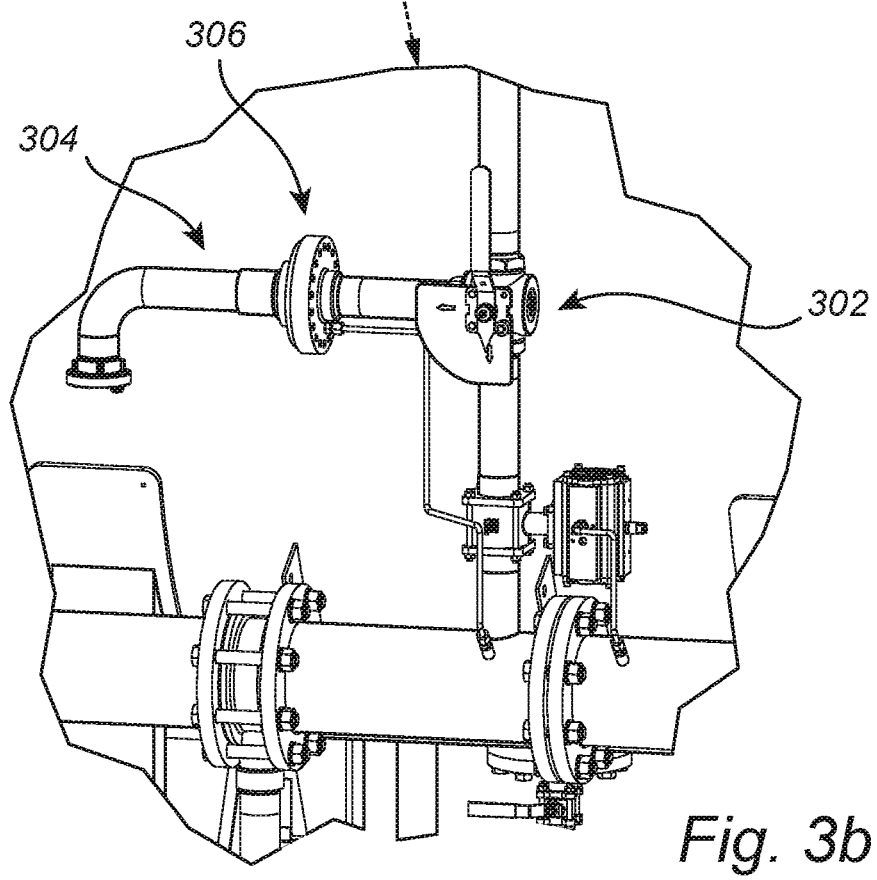

In line with the present disclosure and with further reference to FIGS. 3a and 3b, there is illustrated an exemplary implementation of the firefighting foam-mixing system 100 as shown in FIG. 2, here illustrated with a horizontally arranged storage tank 102, inside of which the membrane/bladder (not explicitly shown) is arranged. The storage tank 102 may of course be otherwise arranged, in line with general concept of the present disclosure.

In comparison to the illustration provided in FIG. 2, the firefighting foam-mixing system 100 is here shown to additionally comprise a three-way valve 302 arranged at the second conduit 114 between the outlet 108 of the storage tank 104 and the first position Pos1. The three-way valve 302 is in the illustration shown to be allowed to be arranged in either of a first and a second state. In the illustration as shown in FIGS. 3a and 3b, the three-way valve 302 is shown to be arranged in the first state, whereby the foaming agent may be introduced to the water line at the first position, i.e. essentially as discussed above and in line with FIG. 2.

As would be apparent from the illustration, in case the three-way valve is turned to the second state, the foaming agent will no longer be allowed to enter into the water line 102. That is, rather, the foaming agent will instead enter into a test line 304 connected the three-way valve 302. In the illustration, the test line 304 is exemplified as provided with a bayonet connection, whereby e.g. a hose (not shown) may be connected. The hose may in turn be allowed to transport the foaming agent to e.g. a test tank (also not shown).

In the illustration provided in FIGS. 3a and 3b, the firefighting foam-mixing system 100 is also shown to include a valve 306 adapted to balance the pressure in the test line 304 (before the valve 306 towards the three-way valve 302) to correspond to the pressure of the water flowing within the water line 102 at the first position, Pos 1. Accordingly, during a testing procedure it may be possible to allow for a continuous monitoring/determination of the proportional flow of the foaming agent as compared to the flow of the water (through the water line 102). Thereby, the testing procedure may be performed without having to rely on the formation of a firefighting foam, where the proportion between the foaming agent in the mixed firefighting foam is then tested (e.g. in a lab).

In addition, in line with this disclosure it may also be possible to reuse the foaming agent, i.e. after the testing procedure is concluded, by "refilling" the storage tank 104 that has been collected in the test tank.

Figure 4A:
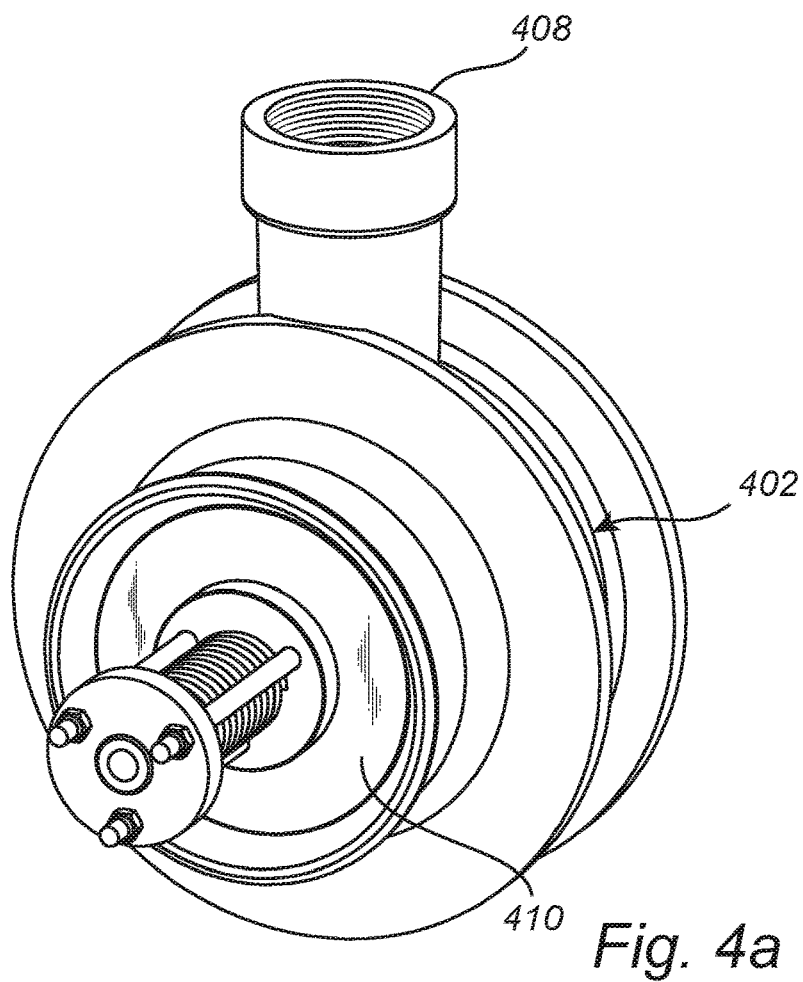
FIGS. 4a and 4b shows an exemplifying illustration of the water diverter arrangement according to the present disclosure.
Figure 4B:
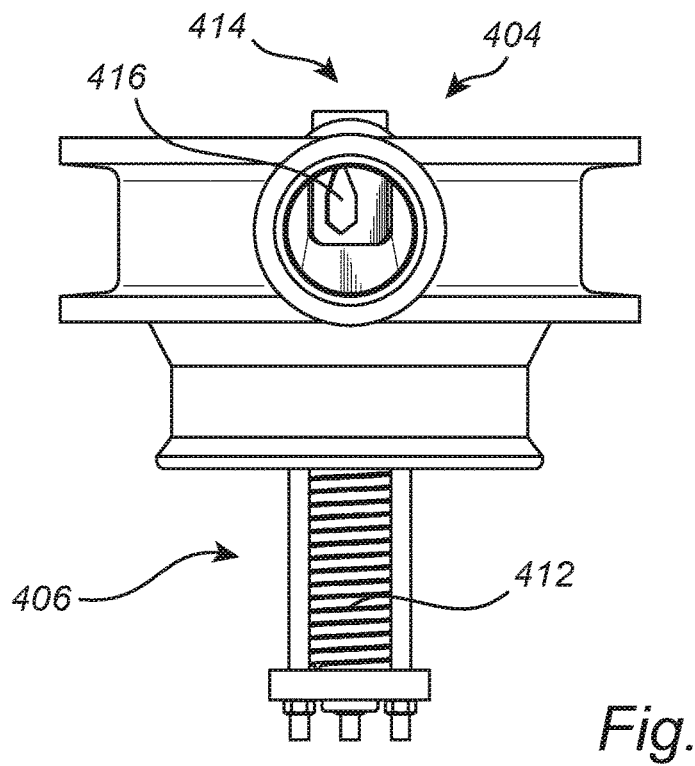

With reference finally to FIGS. 4a and 4b, there is illustrated a currently preferred embodiment of the water diverter arrangement 116. The water diverter arrangement 116 is here shown to comprise a housing 402 for allowing a connection to the water line 102. The housing 402 in turn comprises a water inlet side 404, a water outlet side 406, as well as a water diversion port 408, where at the diversion port 408 the desired proportion of the water is outputted, e.g. 3% as exemplified above. It may of course and in line with the present disclosure be possible to allow the desired proportion to be fixed or dynamically adjusted. Independent on if the desired proportion is fixed or dynamically adjusted, the diversion range may e.g. be between 0.1%-6%.

The water diverter arrangement 116 further comprises a spring mounted plate 410 (exemplified as connected to a spring 412). The plate 410 is in the illustration of FIGS. 4a and 4b shown as arranged on an inlet side of the housing 402. Water entering into the water diverter arrangement 116 at the water inlet side 404 will "push" towards the plate 410, where the spring 412 will function to provide an opposing force in comparison to the current pressure of the water through the water line 102. The plate 410 is in turn connected to e.g. piston means 414, where the piston means 414 in turn controls an opening 416 at the water diversion port 408.

Due to the spring mounting of the plate 410, the opening 416 may be essentially closed below an in comparison low water pressure. Once the water pressure through the water line 102 is increasing, the pressure towards the plate 410 is increased and the piston means 414 will be pushed further "into" the housing 402, whereby the opening at the diversion port 408 is correspondingly increased. The opening may in come embodiments be provided with plate provided with a selected opening that has been adapted to the desired proportion of the water to be diverted through the water diversion port 408. The currently used plate with the opening may for example be allowed to be substituted to differently arranged plate with a differently shaped opening, whereby a different desired proportion of the water to be diverted through the water diversion port 408 may be selected.

In summary, present disclosure relates a firefighting foam-mixing system, comprising a water line for providing a water flow, a storage tank having an inlet and an outlet, the storage tank comprising an internally arranged membrane adapted for holding a foaming agent and connected to the outlet, a first conduit having a first end connected to the inlet of the storage tank, and a second conduit having a first end connected to the outlet of the storage tank and a second end connected to the water line at a first position, wherein the firefighting foam-mixing system further comprises a water diverter arrangement connected to the water line at a second position and to a second end of the first conduit, the second position being upstream of the first position in relation to the water flow through the water line, the water diverter arrangement is configured to, independent of a current flow of water at the second position, divert a predetermined proportion of the water flowing through the water line at the second position, to the first conduit for pressurizing an outside surface of the membrane.

Advantages with the present disclosure includes e.g. the possibility to operate the firefighting foam-mixing system even in situations where there is e.g. a power outage or failure, since the disclosed solution will function without any use of electrical powering.

Although the figures may show a sequence the order of the steps may differ from what is depicted. In addition, two or more steps may be performed concurrently or with partial concurrence. Such variation will depend on the software and hardware systems chosen and on designer choice. All such variations are within the scope of the disclosure. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A firefighting foam-mixing system, comprising:
   a water line for providing a water flow,
   a storage tank having an inlet and an outlet, the storage tank comprising an internally arranged membrane adapted for holding a foaming agent and connected to the outlet,
   a first conduit having a first end connected to the inlet of the storage tank, and
   a second conduit having a first end connected to the outlet of the storage tank and a second end connected to the water line at a first position,
   wherein:
   the firefighting foam-mixing system further comprises a water diverter arrangement connected to the water line at a second position and to a second end of the first conduit, the second position being upstream of the first position in relation to the water flow through the water line,
   the water diverter arrangement is configured to, independent of a current flow of water at the second position, divert a predetermined proportion of the water flowing through the water line at the second position, to the first conduit for pressurizing an outside surface of the membrane, wherein the predetermined proportion is fixed,
   the water diverter arrangement is a proportioning valve comprising: (i) a spring mounted plate connected to a spring for controlling the water flowing through the water line at the second position, and (ii) a piston connected to the plate,
   the spring is arranged to provide an opposing force in comparison to a current pressure of the water through the water line, and
   the piston controls an opening through which the predetermined proportion of the water is diverted.

2. The firefighting foam-mixing system according to claim 1, wherein the water diverter arrangement is configured to operate within a predetermined water flow range.

3. The firefighting foam-mixing system according to claim 1, wherein the foaming agent is introduced to the water line at the first position.

4. The firefighting foam-mixing system according to claim 1, further comprising the foaming agent.

5. The firefighting foam-mixing system according to claim 4, wherein the foaming agent has non-Newtonian properties.

6. The firefighting foam-mixing system according to claim 1, wherein the predetermined proportion is adjustable between 0.1%-6%.

7. The firefighting foam-mixing system according to claim 1, further comprising a three-way valve arranged at the second conduit between the outlet of the storage tank and the first position.

8. The firefighting foam-mixing system according to claim 7, wherein the three-way valve is set to a first state in which the foaming agent is introduced to the water line at the first position.

9. The firefighting foam-mixing system according to claim 7, further comprising a foam test line, wherein the three-way valve is set to a second state in which the foaming agent is introduced to the foam test line.

\* \* \* \* \*